United States Patent [19]

Nordstrom et al.

[11] 4,037,469
[45] July 26, 1977

[54] FORCE MEASURING APPARATUS

[75] Inventors: Kjell Helge Nordstrom; Rune Nils Allan Flinth, both of Vasteras, Sweden

[73] Assignee: Transrail AB, Vasteras, Sweden

[21] Appl. No.: 603,595

[22] Filed: Aug. 11, 1975

[51] Int. Cl.² .................................................. G01L 1/22
[52] U.S. Cl. ..................................................... 73/141 A
[58] Field of Search ............... 73/141 A, 143; 177/147

[56] References Cited

U.S. PATENT DOCUMENTS

| | | | |
|---|---|---|---|
| 3,439,761 | 4/1969 | Laimins | 73/141 A UX |
| 3,448,424 | 6/1969 | Laimins | 73/141 A UX |
| 3,827,514 | 8/1974 | Bradley | 73/141 A X |

*Primary Examiner*—Jerry W. Myracle

[57] ABSTRACT

A load weighing device is provided to determine the magnitude of a load carried by a material handling device such as a lifting crane, hook block arrangement, or the like. The weighing device is designed to be incorporated into existing material handling apparatus and to accurately measure the magnitude of any load being handled by the apparatus while minimizing the likelihood of extraneous forces from introducing erroneous measurements (unrelated to the load) into the weighing system. In a first embodiment of the invention, the material handling apparatus includes a first structure for carrying a load, a second structure from which said first structure is suspended, with one of the structures including an elongated force-transmitting member having a longitudinal axis. A load member has a central portion which engages a portion of the force-transmitting member and the load member also has opposite end portions which engage the other of the structures. The load member is mounted such that the first structure applies a force thereto in proportion to the load in one direction to either the central portion or the end portions of the load member, while the second structue applies a force to the other of the central portion or the end portions. Means are provided for measuring the strain introduced into said load member due to the application of said forces applied thereto.

16 Claims, 20 Drawing Figures

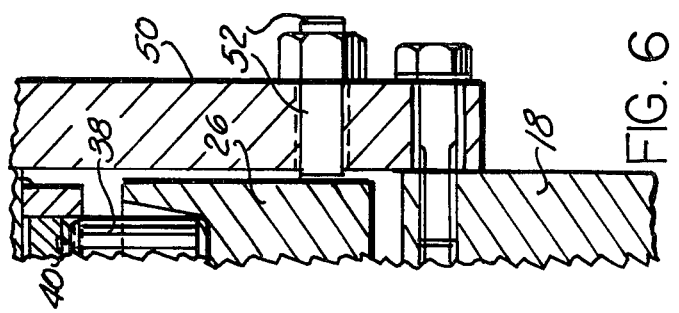
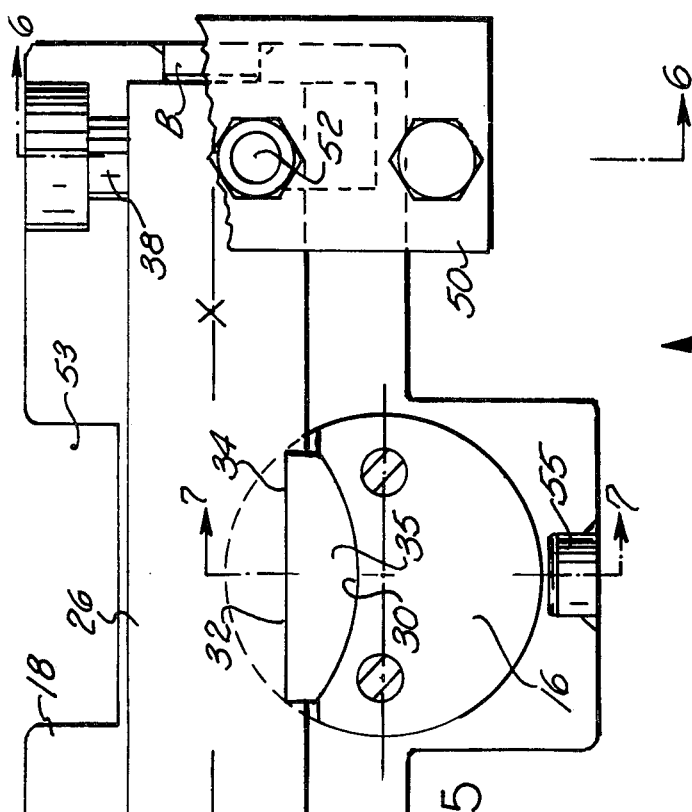
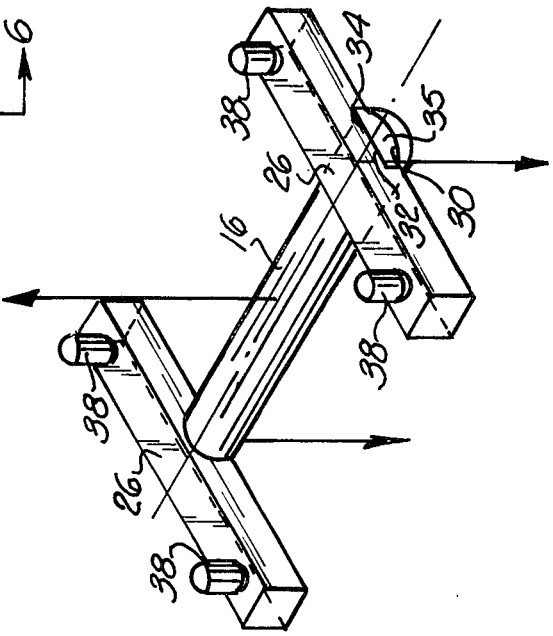
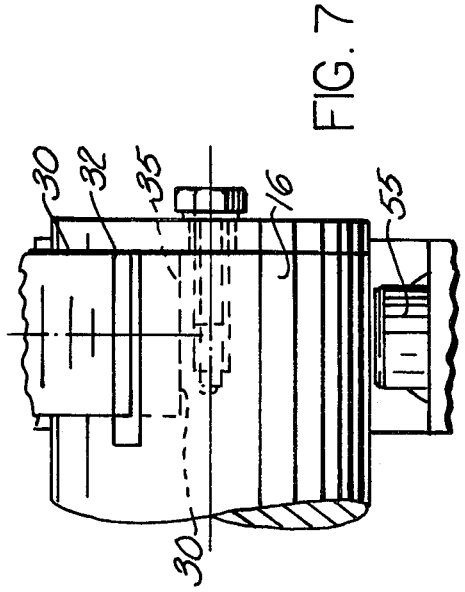
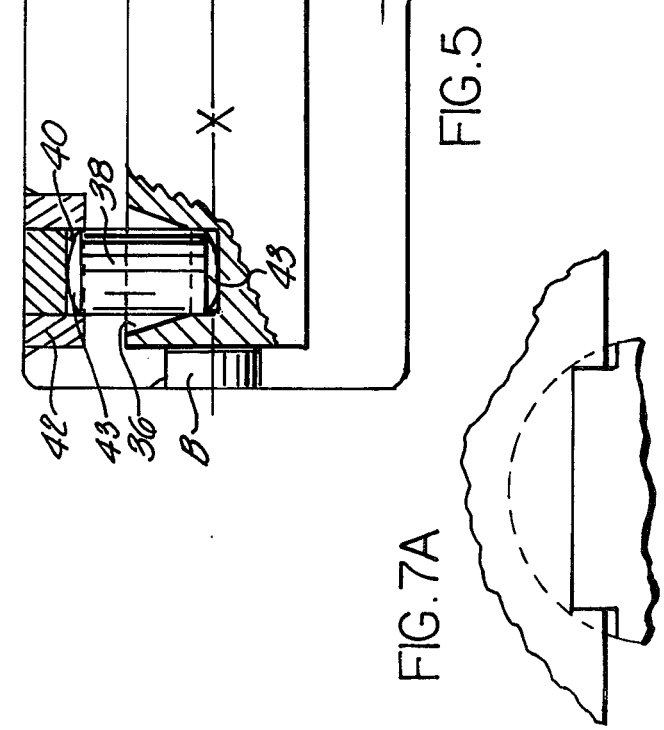

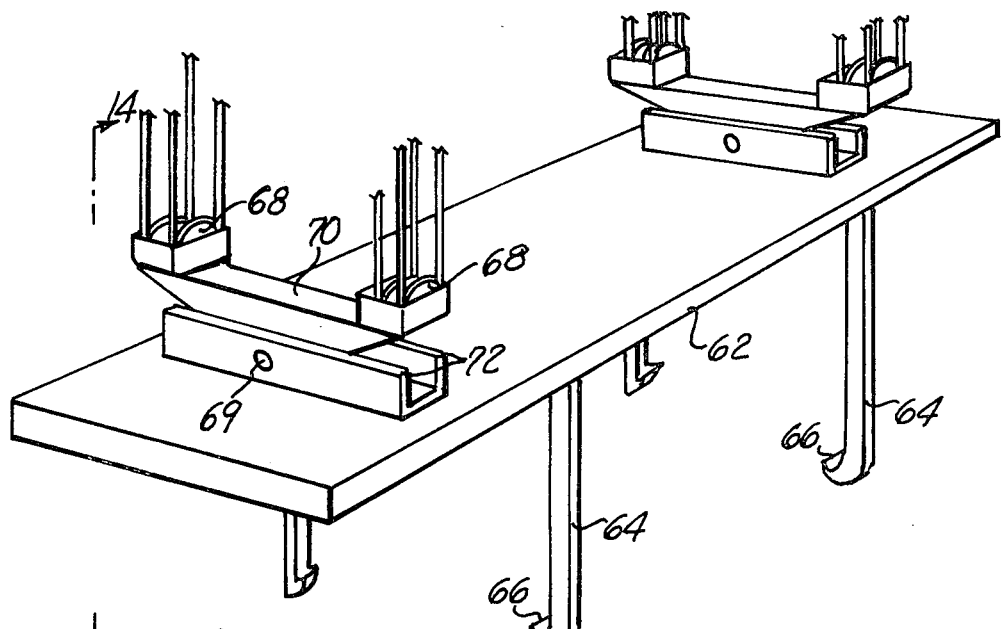
FIG.13
FIG.14
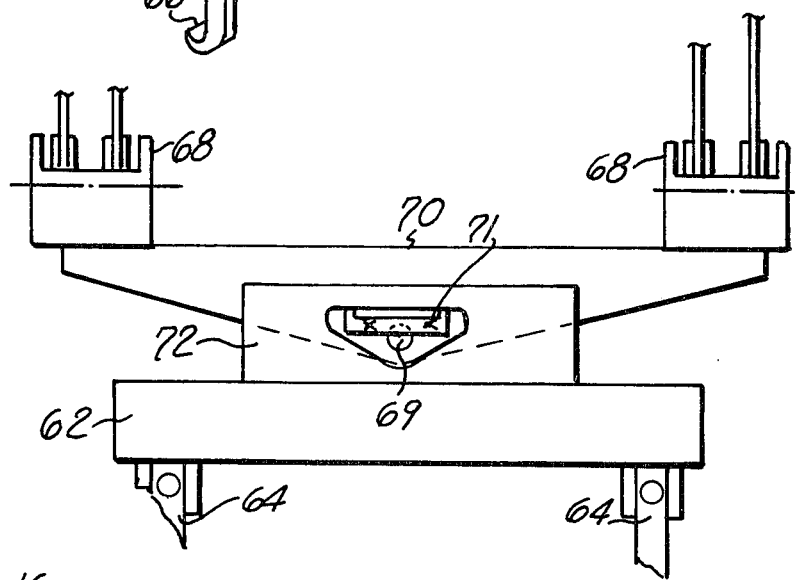
FIG.15
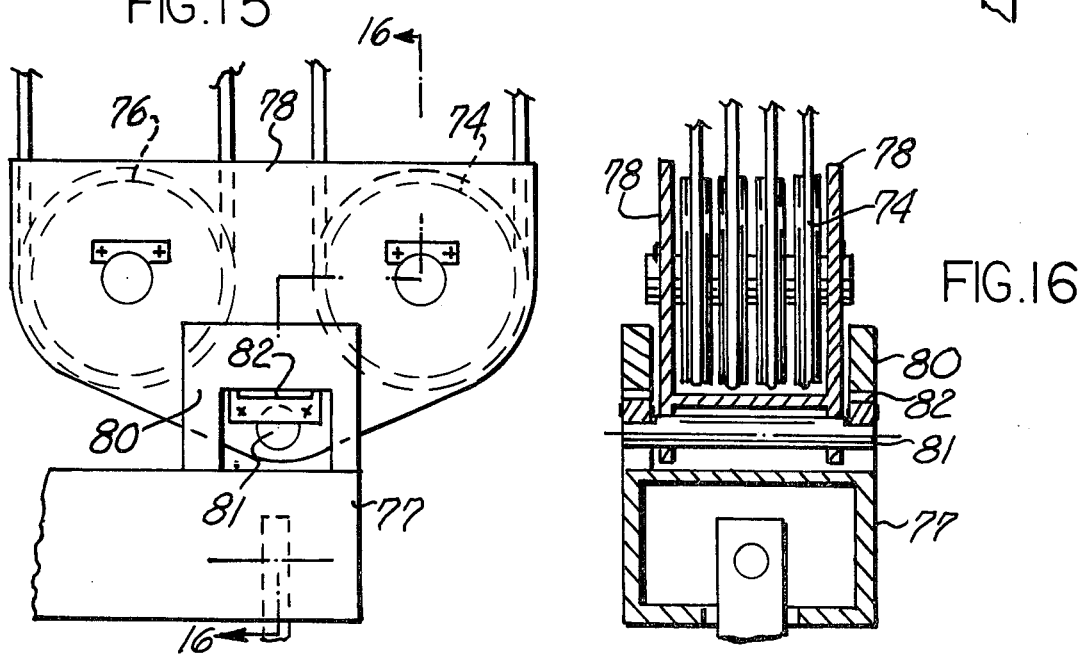
FIG.16

FORCE MEASURING APPARATUS

BACKGROUND OF THE INVENTION

This application relates to material handling apparatus of the general type in which a load is suspended from a pulley arrangement. In particular, the present invention relates to apparatus for measuring the magnitude of a load as it is handled by a material handling device. The principles of this invention are particularly applicable to material handling devices such as teeming cranes, container cranes, hook block arrangements and the like.

A known material handling apparatus which measures the magnitude of a suspended load is disclosed in British Pat. No. 1,105,493. The known material handling apparatus includes a block having a lifting yoke defining an opening for receiving a plate having intricately shaped slots defining a resiliently deflectable central portion. This central portion of the plate carries a load force which is measured by a transducer. The forming of the intricate slots in the plate contributes to the cost of making the material handling apparatus and must be accurately done. Many other devices are known which utilize strain sensing gages in a variety of different environments. Typical of such devices are tensiometers which measure the tension in yarn, a web, or the like, such as shown in U.S. Pat. No. 3,554,025.

SUMMARY OF THE PRESENT INVENTION

The present invention provides apparatus for determining the magnitude of a load carried by a material handling apparatus such as a lifting crane, hook block arrangement, or the like. In particular, the present invention provides a weighing device which is designed to accurately measure the magnitude of any load being handled by the apparatus, while minimizing the likelihood of extraneous forces from introducing erroneous measurements (unrelated to the load) into the weighing system.

Further, the present invention provides for standardized components which are easy to assemble in a handling apparatus and which are easy to replace.

In general, the present invention involves an H-shaped device where the parallel legs of the H comprise load sensing beams. The parallel leges of the H are supported so as to enable floating movement thereof. Further, the cross member of the H is associated with the parallel legs of the H structure so as to enable relative movement to occur therebetween. Accordingly, a loose, as opposed to a rigid structure, is provided and the parts thereof are relatively free to adapt to twisting of the structure in which it is inserted and to adapt to minor machining errors in the structure in which it is located. Because of this ability, a statically determined, well-defined load distribution is maintained even though errors occur.

In a preferred embodiment of the present invention, the material handling device includes a first structure for carrying a load, a second structure from which the first structure is suspended, one of the structures including a longitudinally extending force-transmitting member having a generally horizontal longitudinal axis. The force measurement device includes, preferably, a pair of beam-shaped load members having a central portion engaging a portion of the elongated force-transmitting member. The force transmitting member and the beam shaped load members forming the H-shaped device noted above. Opposite end portions of the load members engage the other structure and extend substantially horizontal and perpendicular to the longitudinal axis of the force-transmitting member. The mounting of the beam-shaped load members is such that the first structure applies a force proportional to the load in one direction to either the central portions or the end portions of the beam shaped members, while the second structure applies a force to the other of the central portion or the end portions. Strain sensing gages are associated with the beam-shaped load member and are preferably adapted to sense the shear strain introduced into the load member, due to the deflection of the load member under the effect of the forces.

DESCRIPTION OF THE DRAWINGS

Other objects and advantages of the present invention will become apparent from the following detailed description of the preferred embodiments of the present invention made with reference to the accompanying drawings wherein:

FIG. 5 is a view showing the details, on an enlarged scale, of the structure shown in FIG. 1;

FIG. 6 is a sectional view of the structure of FIG. 5, taken substantially along line 6—6 of FIG. 5;

FIG. 6a is a schematic view of a portion of the apparatus of FIG. 1;

FIG. 7 is a sectional view of the structure of FIG. 5, taken substantially along line 7—7 of FIG. 5;

FIG. 7A is a schematic view of a modified structure similar to FIG. 6;

FIG. 13 and FIG. 14 are views of a container crane employing the present invention;

FIG. 15 and FIG. 16 show another modified form of the present invention;

DETAILED DESCRIPTION OF PREFERRED EMBODIMENTS OF THE PRESENT INVENTION

The present invention primarily relates to the measuring of the magnitude of a load carried by a material handling device such as a teeming crane, container crane, hook block arrangement or the like. The description which follows describes the manner in which the present invention is applied to these several types of devices for determining the magnitude of a load being handled thereby. However, from the following description, the manner in which the present invention may be similarly applied to numerous comparable devices will be readily apparent to those of ordinary skill in the art.

Figure 18:
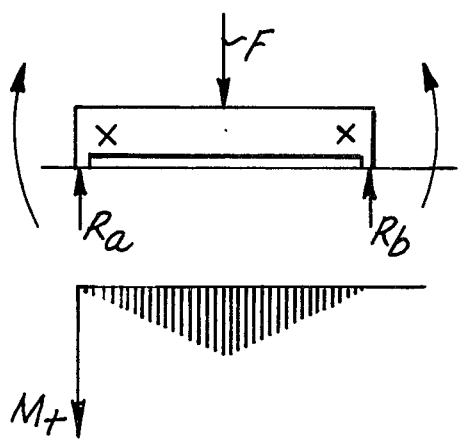
FIG. 18 illustrates a bending moment diagram for a simply supported beam.

FIGS. 1 through 16 all relate to a form of the present invention in which a load sensing device is in a form of a beam which approximates the reaction of a simply supported beam subjected to a concentrated load between its end portions. These principles may be better understood by reference to FIG. 18 which illustrates a simply supported beam with a concentrated load at approximately the mid-point thereof. FIG. 18 illustrates the bending moment diagram of such a beam. A force F applied at approximately the mid-point of the beam produces equal and opposite reaction forces Ra, Rb at approximately the ends of the beam. The double beam design takes internally the bending moment from the reaction forces. Strain sensing gages (represented schematically in FIG. 18 by the X) which preferably sense the shear strain introduced into the beam are connected to suitable circuits (not shown) for transforming the strain measurement into a determination of the magnitude of the load. The double beam could also be gaged as to sense strains due to bending, but this could be less accurate, because the load cells used would be very sensitive to extraneous forces which cause bending moments to be superimposed on the weight strain, and thus sensing shear is preferred.

Figure 1:
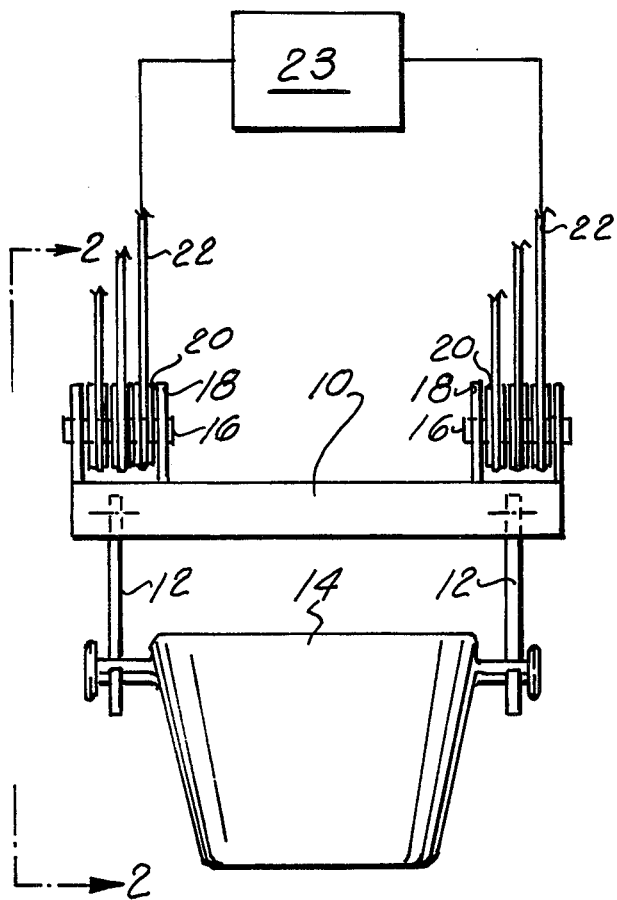
FIG. 1 is a front view of a teeming crane embodying the present invention.
Figure 2:
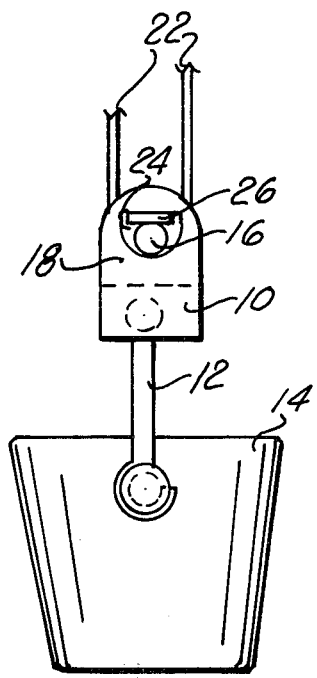
FIG. 2 is a side view of the crane of FIG. 1, taken substantially from the direction 2—2 of FIG. 1.

Referring now to FIGS. 1 and 2, there is shown the lower portion of a material handling device commonly known as a "teeming crane." This type of material handling device is typically found in steel-making plants and includes a first structure in the form of a beam 10 having downwardly depending hooks 12. The hooks 12 are commonly used to support a ladle 14 which receives molten steel from a steel furnace. In this embodiment, the ends of the member 10 are associated with a pair of elongated load transmitting members in the form of a pulley axles 16. The axles 16 extend into recesses on opening 24 in side plates 18 which are fixed relative to the structure 10. The pulley axles 16 rotatably support a plurality of pulleys 20 which have cables 22 entrained thereabout. The pulleys 20 and cables 22 form a second structure and are part of conventional hoisting equipment 23 for raising, lowering and otherwise handling the ladle.

Figure 3:
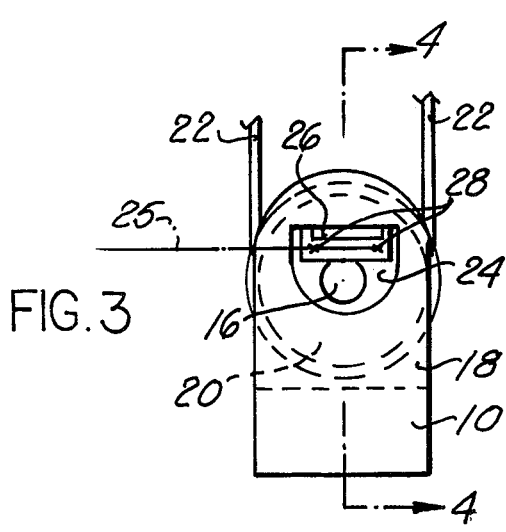
FIG. 3 is a side view similar to FIG. 2, and illustrating the general location of the weighing device of the present invention.
Figure 4:
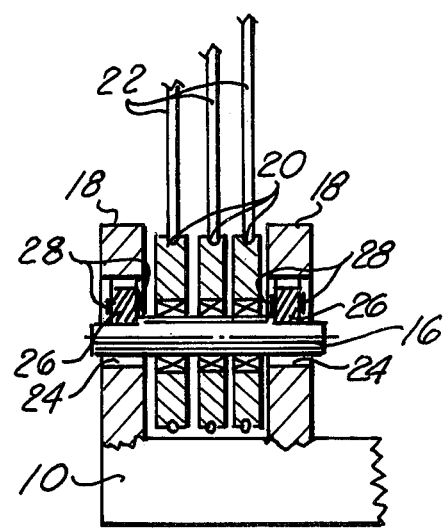
FIG. 4 is a sectional view of the structure of FIG. 3, taken approximately along the line 4—4 of FIG. 3.

As shown in FIGS. 3 and 4, a beam-shaped load member 26 is located in each of the recesses 24 and above the pulley axle 16. Each load member 26 is an elongated member, which approximates a beam. Each member 26 has a pair of strain gages on each side of each end of the member 26. Thus, two strain gages are located on each side of the neutral axis 25 of the beam.

While the foregoing description and the description which follows are specific to a single beam-shaped load member associated with one end of a pulley axle 16, it is contemplated that in a material handling device such as the teeming crane of FIGS. 1 through 4, there is preferably a load member associated with each end of a pulley axle 16. FIGS. 5 and 6 show an end of axle 16 which is provided with a surface 30 which is provided by removing a portion of the axle 16. The surface 30 is either a horizontal upper surface, as shown in FIG. 7a, or a concave upper surface, as shown, on the shaft 16 which abuttingly engages a bronze plate 35. The bronze plate 35 includes a horizontal flat upper surface 32 which engages the load member 26. Specifically, the central portion of the load member 26 includes a recess portion 34 which interfits with the plate 35. The interfitting abutting engagement of load member 26 with the plate 35 minimizes relative movement therebetween transverse to the axis of axle 16. However, the plate 35 and beam member 26 may move relative to the axle 16 in a sliding manner due to the abutting engagement of plate 35 and surface 30 of the axle 16.

In the preferred embodiment, it is contemplated that one end of the pulley axle 16 includes a horizontal upper surface 30, and the other end of the pulley axle 16 includes the bronze plate 35 having a convex lower surface and a horizontal upper surface 32. Further, plate 35 is designed with sufficient clearances from the vertical surfaces of the load member 26 so that the bronze plate 35 has some freedom of movement in a direction parallel to the axis of the axle 16. By providing such a structure in which parts are free to move relatively in this manner, the likelihood of undesirable effects from non-parallel surfaces engaging on torsion stresses is reduced.

The end portions of each load member 26 are connected to a respective side plate 18. Each end portion includes recesses 36 which, in the preferred embodiment, extend to or near the neutral axis of the load member. Each recess 36 receives one end of a loading pin 38, the other end of which is received in a recess 40 in a block 42 secured to the side plate 18. Each loading pin has spherical-shaped ends 43, which serve to direct forces applied to the side plates 18 in directions substantially normal to the longitudinally extending neutral axis of the load member. In view of the construction of the pins 38 and their abutting relationship in the recess 36, the load member 26 is free to pivot relative to the pins and, in turn, the pins are free to pivot relative to the plates 18.

From the above, it should be apparent that each pulley axle 16 is associated at its opposite ends with the load members 26 and that each pulley axle and its associated load members form an H-shaped construction. The load members 26 have flat lower surfaces which engage flat upper surfaces of the pulley shaft 16 or plate 35 supported on the pulley shaft. The H-shaped construction could be termed as a loose or floppy construction in that the load members 26 which form the legs of the H-shaped construction are pivotally supported by the pins 38. Further, the load members can move or slide somewhat transversely of the axis of the pulley shaft 16. In addition, the load members and the pulley axle 16 can move together somewhat in a direction parallel to the axis of the pulley axle 16. As a result of the relative movements which are provided by the floppy H-shaped construction, surface engagement is provided between the beams 26 and the pulley axle 16, even though the pulley axle 16 may deflect somewhat due to forces applied thereto or parts may shift due to forces applied. For example, if the pulley axle would deflect, the load members 26 would follow so as to maintain the flat surface contact between the pulley axle and the load member while rounded ends of the pins 38 roll to accommodate this twisting action. Similarly, if the two sides 18 twist relative to each other due to deflection of the beam or temperature effects on the beam, the plate 35 will shift to maintain the flat surface contact. Accordingly, it should be apparent that the H-shaped construction can take a substantial amount of abuse and still apply loads properly to the load cells for purposes of weight indication.

In order to limit the maximum allowable movement of the H-shaped construction, bumpers B, see FIG. 5, are provided in order to engage the opposite ends of the load member 26 and thereby limit movement of the load members in a direction transverse to the pulley axle 16. Further, bumpers, such as screws 52, are provided to engage the sides of the load members 26 and the end of the axle 16 in order to prevent excessive movement of the H-shaped construction in a direction generally parallel to the axis of the pulley axle 16. The bumpers do not touch the H-shaped construction and the distance between bumpers is slightly larger than member 26 so that only one bumper at a time can contact member 26. Thus, the bumpers cannot introduce compressive or bending stresses in the beam 26.

From the above, it should be apparent that the beam 10 and side plates 18 comprise structure for carrying the load being handled by the crane. It should be further apparent that the beam 10 and plates 18 are suspended form pulley axles 16 which transmit the load force. Thus, the pulley axles 16 are force- transmitting members. The force-transmitting members 16 apply a force to the central portion of the load members 26. This introduces a strain in the load members 26 which is sensed as an indication of the weight to be handled by the crane.

Figure 8:
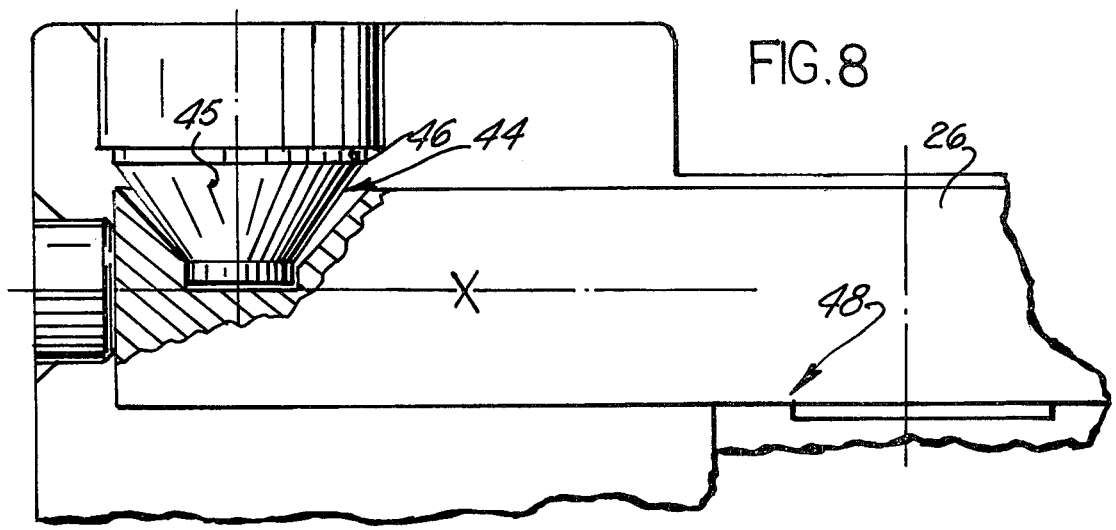
FIG. 8 is a sectional view similar to FIG. 5, and illustrating an alternative design.

Referring to FIG. 8, there is disclosed an alternative design for a loading pin. The loading pin 44 includes a conical upper portion 45 and may include an upper Teflon sliding surface 46. There is also shown, at 48, an alternative design for the upper surface of the axle recess, or bronze plate. This design provides a well-defined loading on the load member 26. In this design, the plate 35 on axle 16 is provided with spaced projections having flat upper surfaces which abuttingly engage the undersurface of the load member 26.

In a crane-lifting device, such as a teeming crane, the effect of side loads due to nonvertical wire ropes are generally quite small and their effect on the accuracy of the weighing has been found to be negligible. However, heavy side loads may be introduced on occasion when the beam 10 accidently collides with a heavy object, such as an iron bucket, steel construction, walls, etc., which would have a tendency to tilt the load member 26 in directions transverse to the axis of the force-transmitting member and thereby be destructive to the device. The above-described bumpers will limit such movement. By way of a further description of the bumpers, bars 50 (only one is shown in FIGS. 5 and 6) are secured to the side plates and the bumper screws 52 are oriented adjacent the sides of the load member 26 in order to take up the reaction forces due to such an accidental side loading. It should be clearly recognized that the bumpers do not affect weighing and do not touch the H construction in such a manner as to affect the weight indication during weighting.

In the embodiments of FIGS. 1 through 7, the information of recess 24 in the side plate 18 includes formation of a portion 53 which depends downwardly and which is aligned with the member 26. Portion 53 is designed for protection in case an element 26 breaks. It should be apparent that in the event the element 26 would break, the load would drop only a short distance, namely, until the clearance between the broken member 26 and the formation 53 is taken up. Further, the formation 53 could be spaced close enough to the member 26 to prevent excessive bending of the member 26. In this manner, possible breakage of the members 26 could be avoided or minimized. Such protection has been found particularly desirable, since the teeming crane, according to the present invention, is one that is likely to encounter heavy overloads. In addition, there is further provided a pin 55 which is designed below the member 16 and which prevents the member 16 from falling apart if the lifting beam 10 is lowered and placed on the ground.

FIGS. 9 through 16 disclose various types of lifting devices and illustrate the location of the weighing devices which are incorporated therein in accordance with the present invention. The weighing devices have been schematically illustrated, and it is contemplated that the specific manner of mounting the weighing device will incorporate many of the features disclosed in the embodiments of FIGS. 5 through 8. However, due to the previous detailed description of FIGS. 5 through 8, the details of the mounting will not be described.

Figure 9:
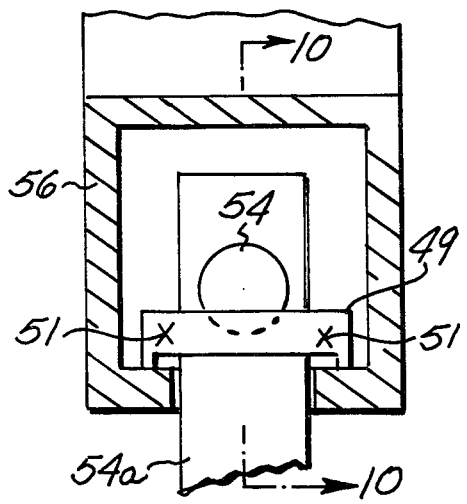
FIG. 9 and FIG. 10 are views of a modified form of the present invention.
Figure 10:
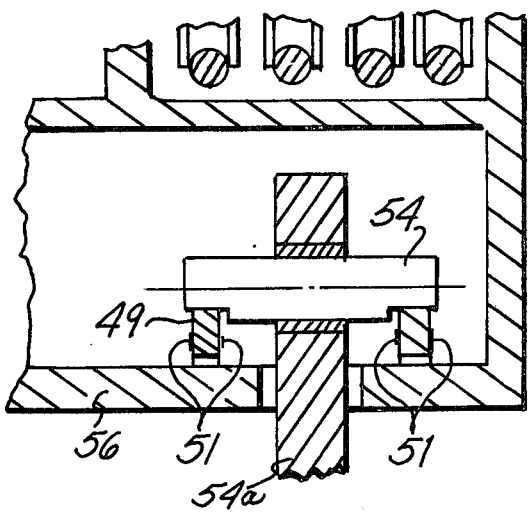

In FIGS. 9 and 10 there is disclosed a form of the present invention in which a load member 49, having strain gages 51, is installed under a force-transmitting member which comprises one of the hook axles 54 of a lifting beam. The axle 54 carries a hook 54a which carries the load. In this arrangement, the loading pin concept is used between each load member 49, and support 56, and cooperating abutting surfaces are provided between the ends of the force-transmitting member, namely, axle 54 and each load member 49. As a result, the axle 54 and load members 49 form a loose H-structure as described above in connection with FIGS. 1–7.

Figure 11:
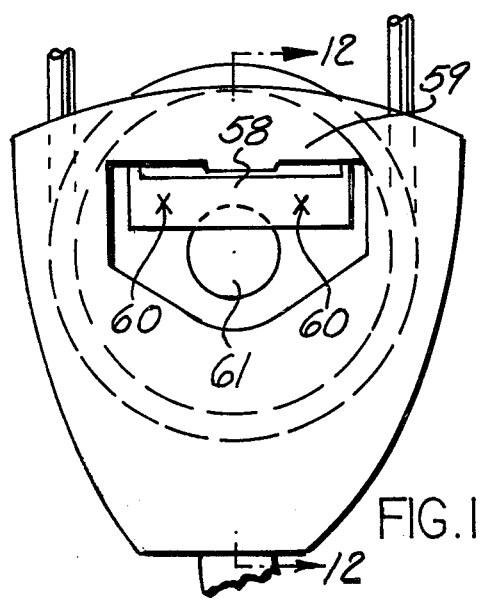
FIG. 11 and FIG. 12 show a still further modified form of the present invention.
Figure 12:
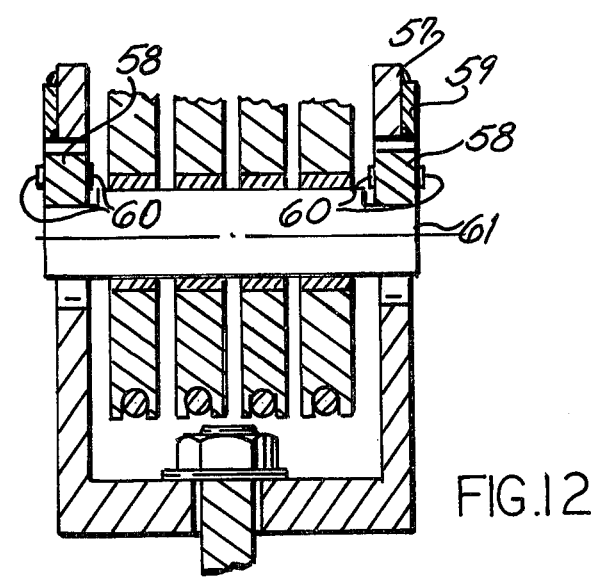

Referring now to FIGS. 11 and 12, there is shown a hook block mechanism embodying the present invention. In this embodiment, a pair of load members 58 carrying strain gages 60 are installed above the force-transmitting member which comprises an axle 61 of the hook block mechanism. The axle 61 rotatably carries pulleys for ropes of the like for carrying the load. The installation of the load member is similar to that shown in FIGS. 1 through 7. It is contemplated that in this embodiment, as well as the other disclosed embodiments, it may be desirable to make the side plates thicker to give adequate support to and to protect the load member. In FIG. 12, the side plates 57 have thick plates 59 added thereto. It is also contemplated that the side plate may be simply formed with sufficient thickness initially. In this embodiment, the pair of load members 58 and axle 61 form the loose H-structure where the various elements thereof are relatively movable.

FIGS. 13 and 14 illustrate a container crane employing the present invention. The container crane includes a platform 62 having four downwardly depending legs 64. The legs 64 include flat bottom ridges 66 for supporting a container. Two pulley arrangements 65 are attached to an elongated support 70. The elongated support, 70, in turn, is pivotally mounted on an axle 60, which forms a force-transmitting member, and which is mounted between two fixed supports 72. In this arrangement, a pair of load members 71 having strain gauges thereon are mounted between the axle 69 and the fixed supports 72 in a manner similar to the arrangement of FIGS. 1 through 7. Again in this embodiment of the pair of load members 71 and axle 69 comprise an H-shaped structure as described in connection with FIGS. 1–7.

FIGS. 15 and 16 disclose the adaptation of the present invention to a typical heavy lifting device. In such a device, it is typical for a pair of pulley arrangements 74, 76 to be supported at each end of a beam 77, and for the axles of both pulleys to be supported between a first pair of side plates 78. The side plates 78, in turn, are pivotally mounted about an axle 81, which comprises a force-transmitting members, and which is supported between a second pair of side plates 80. In such an arrangement, it has been found advantageous to mount the beam load members 82 between the axle 81 and the side plates 80. The details of the mounting are similar to the embodiment of FIGS. 1 through 7, and the load members 82 and axle 81 from the above referred to H-shaped construction.

It should be apparent that in all of the above-described embodiments, an elongated force-transmitting member applies a force to the central portion of a load member in the form of a beam and that means is provided for measuring the strain introduced into the load member.

Figure 17:
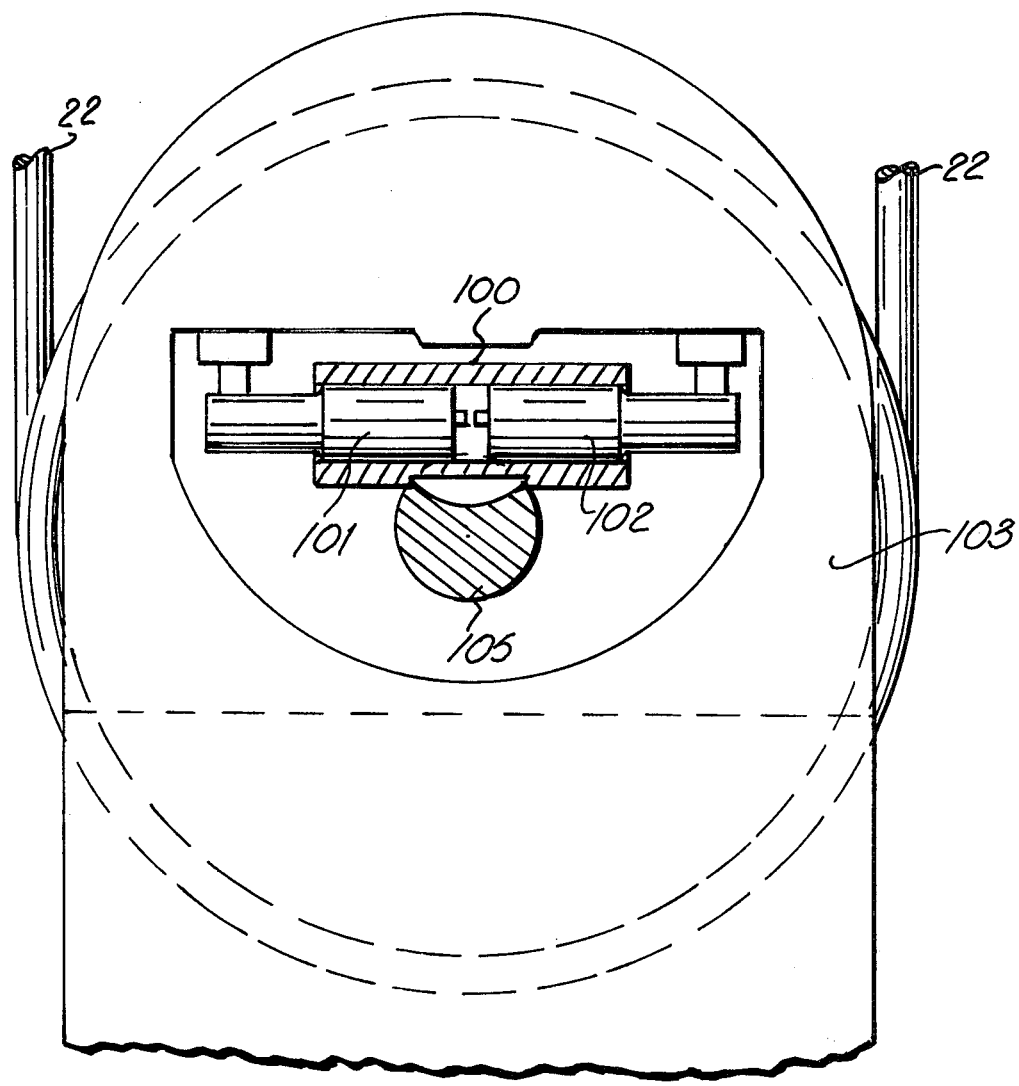
FIG. 17 shows a further modified form of the present invention.

FIG. 17 illustrates a modified form of a load member which can be used in any of the embodiments described as a substitute for the load members therein. The load member shown in FIG. 17 comprises a tubular member 100 which carries a pair of standard shear beam type load cells 101 and 102 which project from the opposite ends of the tubular member 100. The members 101 and 102 are provided with strain gages to sense shear in the members. The members 101 and 102, as shown in FIG. 17, engage and support plate member 103 which carries the loads, as in the embodiment of FIG. 1. Further, as shown in FIG. 17, the pulley shaft 105 is associated with the tubular member 100 and engages the central portion of the tubular member 100. The pulley shaft, of course, rotatably carries pulleys around which ropes are trained. This arrangement is somewhat bulky, due to the fact that the bending moments have to be transmitted through tubular member 100, but standard load cells can be used.

In all of the embodiments described above, it should be apparent that the load-sensing member or beam may be readily replaced in the assemblage for purposes of replacement or repair. The replacement can be effected without the need to remove the pulley shaft or the pulleys, or, for that matter, the ropes. It is further possible to utilize a standard load member, such as 26, and standardize on that load member for any type of crane construction as long as the rated tonnage of the beam is appropriate for the crane. In view of the foregoing, it should be apparent that applicant nas provided a new and improved apparatus.

The foregoing specification has disclosed extremely advantageous apparatus for providing accurate measurements of the magnitude of a load in a lifting device. With the foregoing specification in mind, many and varied modifications of this invention will become readily apparent to those of ordinary skill in the art.

What is claimed is:

1. A material handling apparatus comprising a first structure for carrying a load, a second structure from which said first structure is suspended, one of said structures including an elongated force-transmitting member having a substantially horizontal axis, means interposed between said first and second structures for providing an indication of the magnitude of the load carried by said first structure, said means including at least one load member having a central portion engaging a portion of said elongated member, opposite end portions of said load member engaging the other of said structures, means locating said load member in association with said first and second structures so that said member extends transverse to said longitudinal axis so that said first structure applies a force in proportion to said load in one direction to either said central portion or said end portions of said load member while said second structure applies a force to the other of said central portion or said end portions, means for resisting more than a predetermined amount of movement of said load member in directions transverse to the longitudinal axis of said force-transmitting member including means defining a recess in said force-transmitting member and means defining a corresponding recess in said load member, said recesses being dimensioned to interfit and resist movement of said load member in directions transverse to the central axis of said force-transmitting member, means for resisting movement of said load member more than a predetermined distance in a direction parallel to the central axis of said force-transmitting member, and means for measuring the strain introduced into said load member due to the application of said forces applied thereto.

2. A material handling apparatus comprising a first structure for carrying a load, a second structure from which said first structure is suspended, one of said structures including an elongated force-transmitting member having a substantially horizontal axis, means interposed between said first and second structures for providing an indication of the mangitude of the load carried by said first structure, said means including at least one load member having a central portion engaging a portion of said elongated member, opposite end portions of said load member engaging the other of said structures, means locating said load member is association with said first and second structures so that said load member extends transverse to said longitudinal axis so that said first structure applies a force in proportion to said load in one direction to either said central portion or said end portions of said load member while said second structure applies a force to the other of said central portion or said end portions, a pair of loading pins, one of which is associated with each end of the load member, said load member including a recess at each end, a first end of each loading pin being received in a recess in the load member and a second end of the loading pin being connected to one of said structures, each loading pin comprising a longitudinal shaft terminating in a spherically shaped first end portion and a second end portion terminating in a substantially flat surfce upon which a portion of said one of said structures rests, and means for measuring the strain introduced into said load member due to the application of said forces applied thereto.

3. A material handling apparatus as set forth in claim 2 wherein each loading pin includes a conically shaped portion at its first end, said second end terminating in a substantially flat surface upon which a portion of said one of said structures rest.

4. In a material handling apparatus, an elongated force-transmitting member having a substantially horizontal axis, a pair of beam members having central portions engaging spaced portions of said elongated member, said beams deflecting in response to forces applied thereto, said pair of beam members and said elongated member forming an H-shaped structure with said beams forming the legs of the H-shaped structure, said H-shaped structure being associated with a first structure for carrying a load and a second from which the first structure is suspended, wherein said H-shaped structure is supported for movement relative to said first and second structures, said H-shaped structure being interconnected with said one of said first and second structures by pins extending between said pair of beams and said one of said first and second structures and which enable relative movement to occur between said one of said structures and said H-shaped structure, and means for measuring the strain introduced into said beams due to the application of said forces applied thereto.

5. In a material handling apparatus, an elongated force-transmitting member having a substantially horizontal axis, a pair of beam members having central portions engaging spaced portions of said elongated member, said beams deflecting in response to forces applied thereto, said pair of beam members and said elongated member form an H-shaped structure with said beams forming the legs of the H-shaped structure, said beams and said elongated member having cooperating flat abutting surface association enabling relative movement to occur therebetween, said flat abutting surface association being provided by a plate having a flat surface for engaging said beam member and a concave surface engaging a convex surface on said elongated member, and means for measuring the strain introduced into said beams due to the application of said forces applied thereto.

6. A material handling apparatus comprising a first structure for carrying a load, a second structure from which said first structure is suspended, one of said structures including an elongated force-transmitting member having a substantially horizontal longitudinal axis, means interposed between said first and second structures for providing an indication of the magnitude of the load carried by said first structure, said means including at least one longitudinally extending load member having a central portion engaging a portion of said elongated force transmitting member connected with one of said structures, opposite end portions of said longitudinally extending load member engaging the other of said structures, means locating said longitudinally extending load member in association with said first and second structures with said longitudinally extending load member extending transverse to the longitudinal axis of the force transmitting member associated with one of the structures, said force transmitting member being adapted to a transmit force in proportion to said load in a force measuring direction which is disposed normal to the longitudinal axis of said load member to either said central portion or said end portions of said load member while the other of said structures applies a force in said force measuring direction to the other of said central portion or said end portions of said load member, said load member being mounted for movement relative to said force transmitting member in directions transverse to said force measuring direction, and means for measuring the strain introduced into said load member due to the application of the force in said force measuring direction applied thereto.

7. A material handling apparatus of the type set forth by claim 6 wherein said first structure comprises a pair of substantially parallel plates, said second structure comprises one or more pulleys, said force-transmitting means comprising a pulley axle supported by said plate members, the central portion of each load member engaging said pulley axle, and the end portions of said load member engaging one of said side plates.

8. A material handling apparatus as set forth in claim 6 including means for resisting more than a predetermined amount movement of said load member in directions transverse to the longitudinal axis of said force-transmitting member.

9. A material handling apparatus as set forth in claim 8 wherein said means for resisting movement of said load member includes means defining a recess in said force-transmitting member and means defining a corresponding recess in load member, said recesses being dimensioned to interfit and resist movement of said load member in directions transverse to the central axis of said force-transmitting member.

10. A material handling apparatus as set forth in claim 6 further including a pair of loading pins, one of which is associated with each end of the load member, said load member including a recess at each end, a first end of each loading pin being received in a recess in the load member and a second end of the loading pin being connected to the one of said structures which applies a force to the end portions of said load member.

11. A material handling apparatus as defined in claim 6 wherein said load member comprises a tubular member having members projecting from opposite ends thereof, said members carrying said means for measuring strain.

12. A material handling apparatus as defined in claim 6 wherein said load member comprises a one-piece beam having said means for measuring strain applied thereto.

13. In a material handling apparatus, an elongated force-transmitting member having a substantially horizontal axis, a pair of longitudinally extending elongated beam members having central portions engaging spaced portions of said elongated force transmitting member, said elongated beam members deflecting longitudinally in response to forces applied to the end portions of said beam members and to the portion of the force transmitting member engaging the central portions of said elongated beam members and directed in a force measuring direction normal to the longitudinal axes of the elongated beam members, said elongated beam members engaging said force transmitting member in a manner which permits movement of said beam members relative to said force transmitting member transverse to said force meassuring direction, and means for measuring the strain introduced into said beam members due to the application of said forces applied thereto.

14. A material handling apparatus as defined in claim 13 wherein said pair of beam members and said elongated member form an H-shaped structure with said beam members forming the legs of the H-shaped structure.

15. A material handling apparatus as defined in claim 14 wherein said beam members and said elongated force transmitting member have cooperating flat abutting surface association enabling relative movement to occur therebetween.

16. A material handling apparatus as defined in claim 14 wherein said H-shaped structure is associated with a first structure for carrying a load and a second structure from which the first structure is suspended, and wherein said H-shaped structure is supported for movement relative to said first and second structures.

* * * * *

UNITED STATES PATENT AND TRADEMARK OFFICE
CERTIFICATE OF CORRECTION

PATENT NO. : 4,037,469
DATED : July 26, 1977
INVENTOR(S) : Kjell Helge Nordstrom and Rune Nils Allan Flinth It is certified that error appears in the above-identified patent and that said Letters Patent are hereby corrected as shown below:

Column 7, line 64, after "said" (second occurrance) add --load--.
Column 10, line 44, change "meassuring" to --measuring--.

Signed and Sealed this

Thirteenth Day of December 1977

[SEAL]

Attest:

RUTH C. MASON
Attesting Officer

LUTRELLE F. PARKER
Acting Commissioner of Patents and Trademarks